United States Patent [19]

Fujita

[11] 4,138,964
[45] Feb. 13, 1979

[54] AUTOMOBILE SERVICE AND INSPECTION TIME INDICATING DEVICE

[75] Inventor: Haruyasu Fujita, Tokyo, Japan

[73] Assignee: Honda GikenKogyo Kabushiki Kaisha, Tokyo, Japan

[21] Appl. No.: 754,073

[22] Filed: Dec. 23, 1976

[30] Foreign Application Priority Data

Jan. 5, 1976 [JP] Japan .................................. 51-71[U]
Jan. 6, 1976 [JP] Japan .................................. 51-311[U]

[51] Int. Cl.² ...................... G01C 22/00; G01D 21/00
[52] U.S. Cl. ................................. 116/62.4; 235/95 R
[58] Field of Search ....................... 116/114 W, 28 R; 235/95 R, 96, 144 R, 144 SM; 240/2.1, 1 LP

[56] References Cited

U.S. PATENT DOCUMENTS

| 2,004,881 | 6/1935 | Slye | 235/96 X |
|---|---|---|---|
| 2,253,827 | 8/1941 | Vinton | 116/28 R X |
| 2,640,144 | 5/1953 | Levy | 240/2.1 |
| 2,656,817 | 10/1953 | Jones | 116/114 W |
| 3,164,918 | 1/1965 | Brown | 240/2.1 X |
| 3,198,430 | 8/1965 | Hermann | 235/95 R |
| 3,598,309 | 8/1971 | Engler | 235/96 X |
| 3,935,996 | 2/1976 | Kleinböhl | 116/114 W |
| 3,962,986 | 6/1976 | Fujita et al. | 116/114 W |

Primary Examiner—Daniel M. Yasich
Attorney, Agent, or Firm—Irving M. Weiner; Pamela S. Austin; Melvin Yedlin

[57] ABSTRACT

An automobile service and inspection time indicating device wherein the members for performing the resetting operation are recessed from the surface of the outer plate of the meter case to avoid inadvertent operation of the resetting mechanism. The indicating elements can be positively seen during the daytime or at night.

3 Claims, 5 Drawing Figures

AUTOMOBILE SERVICE AND INSPECTION TIME INDICATING DEVICE

The present invention relates to improvements in vehicle service and inspection time indicating devices whereby items requiring to be serviced and inspected, such as the replacement of the engine oil and tires, are detected one by one depending on the driven distance of the vehicle and the driver is warned of such items.

More particularly, the invention relates to an automobile service and inspection time indicating device whereby, after the inspection of such item on the basis of a fixed warning indication in the above mentioned device, a resetting misoperation of returning said indicating device to the starting position by setting operation by a mischief or the like by a third person are prevented, the visual perceptibility from outside of such indicating element at the warning indicating time is improved, and the discernment is made positively.

BACKGROUND OF THE INVENTION

In automobiles, services and inspections, such as the replacements of the engine oil, tires and parts depending on the driven distance, must be made in addition to legal inspections provided by law. Such various services and inspections with the driven distance are explained in the manual and/or specification and the like of the automobile, but the user or owner will often forget that such time has come and this may cause a failure, a malfunction, and unsafe conditions.

U.S. Pat. No. 3,962,986 discloses a device whereby the position variation of a rotary member, driven by and operatively connected with an integrating odometer, is detected and the service and inspection time is detected and indicated by the run distance.

In such prior device, a plurality of rotary members, corresponding to the number of service and inspection items, driven by and operatively connected with the integrating odometer, are provided. Each rotary member is provided with an indicating element and is so formed as to be stopped at a predetermined rotary angle for each item by a stopper or abutment. The indication is held in this position so that the indicating element may be visually perceived from outside and, unless the service and inspection are made according to the indicated item and the resetting operation is made, the indication will be continued. After the fixed service and inspection, the resetting member is consciously operated, the corresponding rotary member, held in the stopped state and making an external indication is released, is reset to the start position and is again made to perform a time detecting operation with the run distance.

In such prior device, in case the operating manner, such as a setting button operating the resetting member, is projected on the front surface of the meter case of the instrument panel, there is a danger of misoperation due to the resetting button being unintentionally pushed by the driver, or being pushed by the contact with a hand in cleaning the car body, or being pushed mischievously by a third person. As a result, the rotary member having rotated with the progress of the run distance and having counted, it will return to its original position. Therefore the indicating device will start from the integrated distance on the way, and the next time indication will be made as having said integrated distance added therein. Therefore, the service and inspection time will not be detected accurately, the device will become useless, and no effective or timely service and inspection will be made and a failure may result.

Further, in said prior device, an opening, such as a window, is usually made on the surface opposed to the path of the rotary indicating member of the outer plate of the case of the instrument panel so that the indicating element of the rotary member may be visually perceived from outside the case. The indicating element is illuminated with the reflection of outside light during the daytime, or with an illuminating device, such as a miniature bulb, provided in the case at night so as to be visually perceivable from outside. In such device, in order to improve the visual perceptibility of the indicating element, such as a dial, the window must be made close so as to take in more external light in the daytime, or must be illuminated with the light of a miniature bulb at night so as to apply more reflected light of the miniature bulb to the indicating element by increasing the distance of the window from the indicating element. As evident from this, the respective conditions in the reflected illumination in the daytime and at night are opposed to each other, and it is difficult to obtain a visual perceptibility favorable both in daytime and night.

SUMMARY OF THE INVENTION

The present invention provides a vehicle service and inspection time indicating device including a meter case, and an integrating odometer enclosed within the meter case. Rotary members are rotatably and operably connected with the integrating odometer. An indicating element, provided on the surface of each of the rotary members, is visually perceivably indicated on the front surface of the meter case from a panel of the meter case, and this indicating state is maintained until the rotary member is stopped and reset. Resetting operation members are provided so that their end surfaces do not project front the from surface of the meter case. The device also includes means for releasing and resetting the rotary members. Each resetting operation member is so formed as to be operably connected to said means for releasing the rotary member and resetting it to the starting position.

An object of the invention is to provide a vehicle service and inspection time indicating device whereby, after or during the service and inspection time indication, misoperation, such as by an inadvertent operation or mischievous operation of the resetting operation member is prevented and, only in case the resetting operation is consciously and intentionally made, said operation will be able to be made.

Another object is to provide an automobile service and inspection time indicating device which makes the time detecting operation positively, functions effectively, and improves the safety of the automobile with a simple structure wherein the resetting operation part is recessed from the surface of the outer plate of the case.

A further object is to provide an automobile service and inspection time indicating device whereby the visual perceptibility from outside of the time warning indicating element is satisfactory and favorable even under respective illuminating conditions different in the daytime and at night so that the indicating element can be positively discerned both in the daytime and at night.

Another object is to provide an automobile service and inspection time indicating device wherein a transparent member that is lustrous on the outer surface is fitted to the outer plate of the case and is brought at one end close to the surface of the indicating member, and at the other end to be present on the outer plate of the case so that the visual perceptibility may be improved with simple structure.

DETAILED DESCRIPTION

Figure 2:
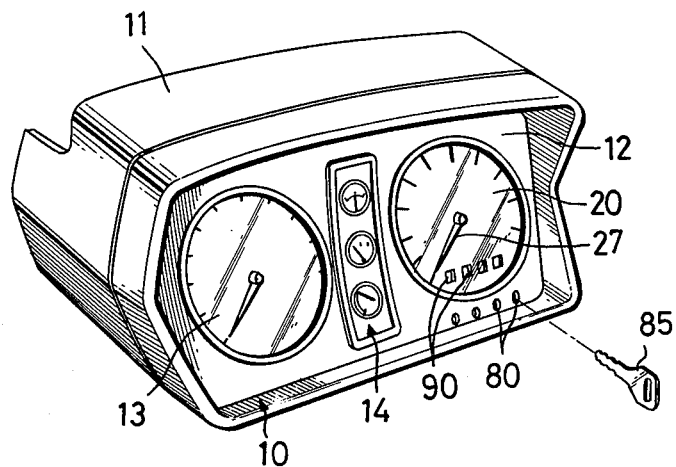
FIG. 2 is a perspective view showing the appearance of a meter part of an automobile including said device.

FIG. 2 is a perspective view of a meter section 10 of an automobile including a service and inspection time indicating device according to the present invention. A speedometer 20, tachometer 13 and gauges 14, such as an oil pressure gauge, a water thermometer gauge, and a fuel gauge, are visually perceivably provided on a front plate 12 of a case 11.

Figure 1:
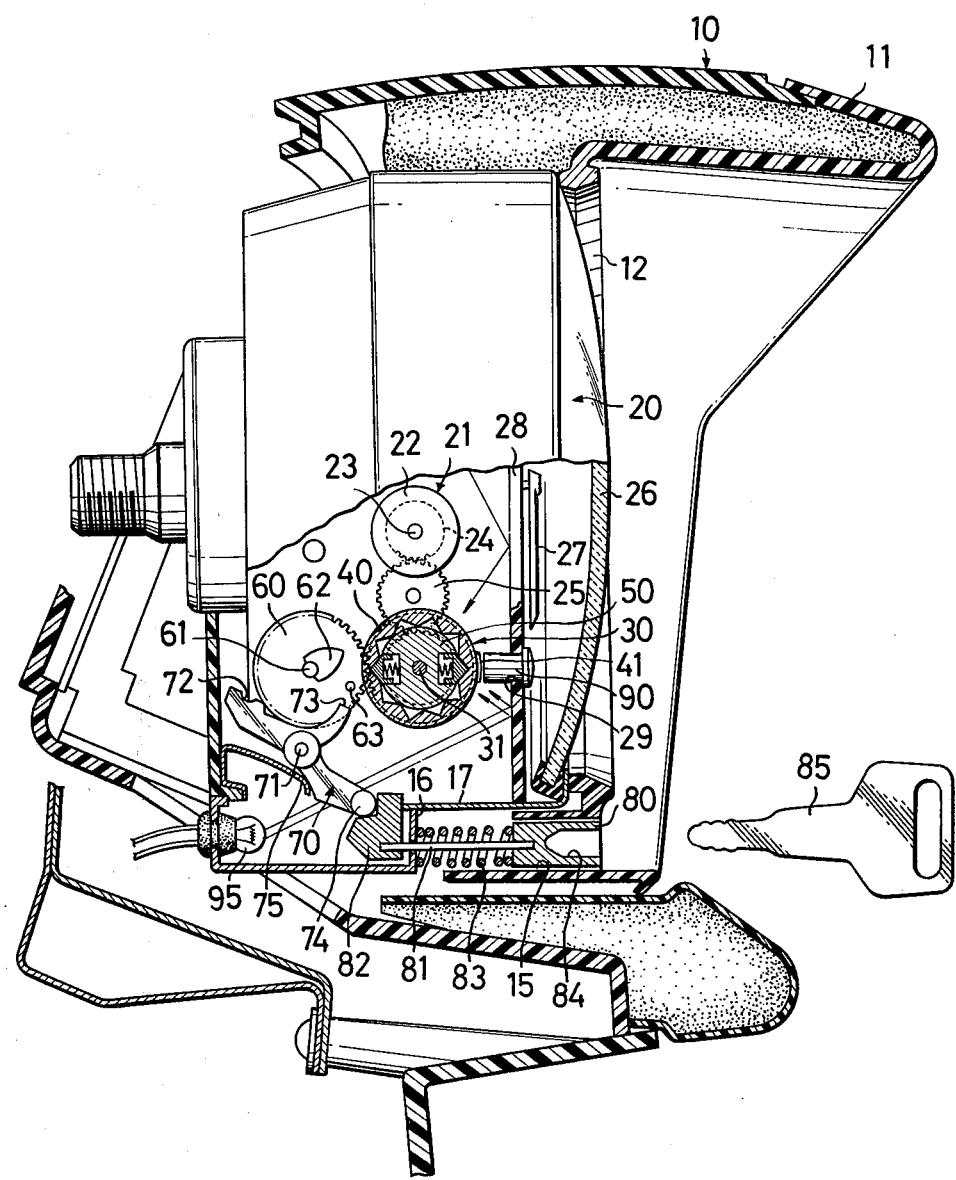
FIG. 1 is a side view of a device according to the present invention, as sectioned in the essential parts.
Figure 3:
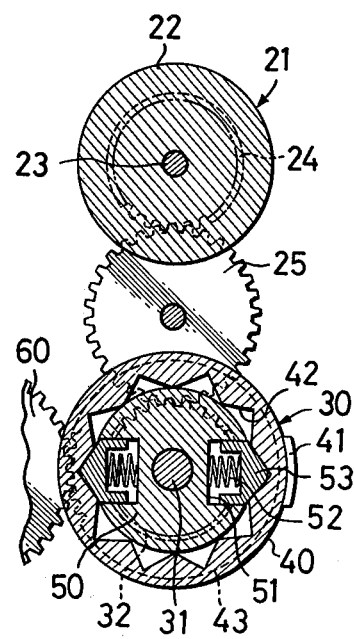
FIG. 3 is a magnified sectioned side view of an essential mechanism part to explain a time detecting mechanism.

FIG. 1 is a side view of the speedometer 20, sectioned in the essential parts. The device of the present invention is fitted in said meter 20. FIG. 3 shows an essential mechanism part of the service and inspection time indicating device as magnified.

A shaft 23, connected with a digit wheel 22 of any figures rotating intermittently per graduation of an integrating odometer 21 of the speedometer 20, is provided with a gear 24 which is meshed and connected with a gear 32 provided on a shaft 31 of a rotary member 30 through an intermediate transmission gear 25. The rotary member 30 consists of an outer wheel 40 and an inner wheel 50 fitted to said outer wheel 40 and rotating integrally with the shaft 31. Such rotary members 30 are provided on the shaft 31 so as to correspond to the number of fixed items to be serviced and inspected.

Indicating elements 41, colored with respectively different colors or the like showing the above mentioned respective items, are provided on the surfaces of the respective outer wheels. The inner and outer wheels 50 and 40 of each rotary member 30 are connected with each other through a clutch means interposed between them. In the illustrated embodiment, V-shaped grooves 42 are radially formed on the inner periphery of the outer wheel 40 loosely fitted to the outer periphery of the inner wheel 50. The inner wheel 50 is provided with engagers 53 respectively fitted in recesses 51 provided to open on its peripheral surface and resiliently projected in the radial direction by springs 52. Engagers 53 respectively resiliently frictionally engage with grooves 42 so that the rotation of the inner wheel 50 may be transmitted to outer wheel 40.

Outer wheel 40 is meshed with a resetting gear 60 rotatably supported by a shaft 61 through and behind a gear part 43 provided on the side. As many of such gears 60 as the plurality of rotary members 30 are provided on shaft 61 so as to correspond to the rotary members. On the side of each gear 60, a resetting cam 62 is concentrically provided and a stopper or abutment 63 is also provided. On the side of each gear 60, a substantially Y-shaped resetting lever 70 is rockably supported by a shaft 71. Lever 70 engages cam 62, rotates gear 60, and contacts a cam part 72 and stopper 63 resetting outer wheel 40 to the start position. Lever 70 also contacts with a stopper part 73 stopping outer wheel 40 through the gear 60 and with the later-described setting button, is provided with a projecting part 74 rocking it and is provided with a plate spring 75 on the back surface so as to make a return operation when it is rocked.

The device is driven through the gears 24, 25 and 32 and shaft 31 by the intermittent rotation of the digit wheel 22 of the integrating odometer. When the inner wheel 50 rotates, the outer wheel 40 will be rotated by the frictional engagement of engager 53 with groove 42. The indicating element 41 will coincide with the later-described window part at a predetermined rotation angle of the outer wheel 40, and element 41 will become able to be seen from the surface of speedometer 20 in meter case 11 so as to be visually perceived by the driver.

Rotation of the outer wheel 40 will be transmitted to the gear 60. With its rotation, the stopper 63 will collide with the stopper part 73 of the setting lever 70. The gear 60 will be locked in this position and thus the outer wheel 40 meshing with it will be locked. As the inner wheel 50 is frictionally engaged with the outer wheel 40, the engager 53 will resiliently emerge and submerge in the recess 51 along the groove 42. The inner wheel 50 will continue to rotate and the outer wheel 40 will be held in this position, and will remain therein until the resetting operation is made. Therefore, the time detecting operation by the run distance of the other rotary member provided on the same shaft will not be obstructed.

In the lower part of the meter case 11 in which the service and inspection time indicating device formed as in the above is fitted, in the position fitting the resetting lever 70, each hole 15 communicating with the interior of the case is made in the forward and rearward direction. As many of such holes 15 as the resetting levers are provided so as to correspond to them. A resetting button 80, which is a resetting operation member, is loosely fitted in each hole 15 so that its end surface will not project from the surface of the case 11, and is connected through a stem 81 with a pressing member 82 positioned in the rear of a partition wall 16 provided in the inner part of the hole 15. A return spring 83 is compressed and fitted between the front surface of the partition wall and the resetting button 80. The resetting button 80 will thus be resiliently pressed, and the front end edge of the pressing member 82 will contact the end edge of the partition wall 17. Therefore normally the resetting button 80 will be held in the hole 15 as shown in FIG. 1 so that its end surface will not project from the surface of case 11. A groove 84 in the axial direction is provided on the end surface of button 80, and is set as to be engageable with an ignition key 85 of the automobile.

The front surface of speedometer 20 is covered with a transparent cover plate 26, such as a glass plate. A pointer 27 and a panel 28 having graduations of speeds or the like indicated on the surface are provided inside the cover plate. The integrating odometer and the device housed behind the panel 28 are covered with this panel. Between the rear surface of panel 28 and the front surface of rotary member 30, i.e., the surface of outer wheel 40, a proper clearance is provided, and an opening 29 is made in the visual path of element 41 of rotary member 30 in the lower part of panel 28.

A bar-shaped transparent body 90 of substantially round cross section formed of, for example, acrylic resin or glass, is fitted and inserted in opening 29 so as to project mostly on the inside surface of panel 28. The tip surface 91 of transparent body 90 is made to approach the outer peripheral surface of rotary member 30 so as to open such clearance as will not obstruct the rotation of the rotary member 30 including the indicating element 41 between them. In the base end part on the opening 29 side of body 90, a flange part 92 of a diameter larger than the inside diameter of opening 29 is integrally formed, and is set so that the rear surface of flange 92 may contact the periphery on the front surface of panel 28 of opening 29 to maintain such clearance. Further, in the illustrated embodiment, the end surface of the projecting part to the front surface of panel 28 of the transparent body 90 is outwardly curved and expanded so as to have a lens effect with this expanded part 93. All the outer peripheral surface 94 of the round-sectioned bar-shaped transparent body 90 is made with a lustrous surface. An illuminator, such as a miniature bulb 95 (FIG. 1), is set in the chamber in which the device is fitted in the rear part of meter panel 28.

Figure 4:
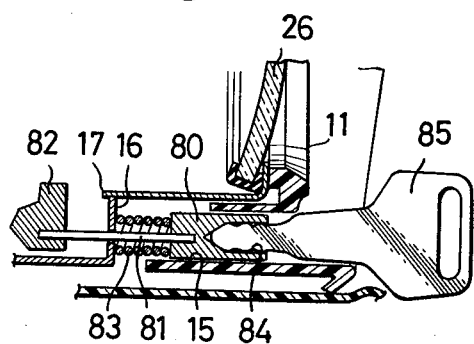
FIG. 4 is a sectioned side view of an essential part to explain a resetting operation.

When the outer wheel 40 of rotary member 30 stops, the indicating element 41 will be visually perceived from outside through the transparent body 90 so that the driver may make such service and inspection corresponding to the indicated item as, for example, the replacement of the engine oil, tire rotation, tires or parts. After the fixed service and inspection are made, the resetting button 80 is pressed to perform the resetting operation. However, as the resetting button does not project on the front surface of the case and is resiliently supported, the pressing operation will be difficult to make wih a finger tip and therefore a pressing operation member wll be required. However, the ignition key 85 can be inserted into groove 84 to easily press the resetting button. This is shown in FIG. 4. When button 80 is pressed, the pressing part 82 will be advanced through the stem 81. The resetting lever 70 contacting with projecting part 74 wil be rocked clockwise against the spring 75 (FIG. 1) and the cam part 73 will contact cam 62 to rotate the resetting gear 60. Thus, the outer wheel 40 meshing with gear 60 will be rotated through the predetermined angle. Indicating element 41 facing the transparent member 90 will also be integrally rotated to be reset in the count start position. When the pressing of button 80 is released, by the action of the spring 83, the button 80 including the pressing part 82 and rod 81 will be returned to the position shown in FIG. 1.

Thus, because the resetting button 80 does not project on the front surface of the case 11, it will not be pressed by mistake or mischief and, unless it is pressed by using a member, such as the ignition key, no resetting operation will be made. Thus, misoperation of the resetting button is prevented.

Figure 5:
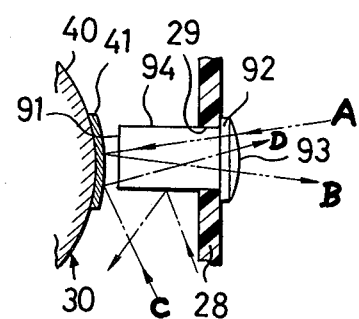
FIG. 5 is a view for explaining the operation of an indicating element visually perceiving member.

The indicating element is visually perceived from outside through the end surface of the transparent body 90 present on the front surface of the panel 28. In the daytime, a light ray A (see FIG. 5) incident from the front surface of the panel 28 will pass through the transparent body 90 and will be reflected by the indicating element 41 and this reflected light ray B will pass through the transparent body 90 and will be led out of the end surface so that the indicating element may be easily and positively visually perceived from outside by the action of this reflected illumination.

At night, the interior of case 11 will be illuminated with a miniature bulb 95 (FIG. 1). Reflected light ray C (FIGS. 1 and 5) will hit the surface of element 41, will be reflected by this surface effectively due to the clearance between the end surface 91 of the transparent body 90 and the indicating element 41, and will be led out through the transparent body 90 as a reflected light ray D so that the indicating element may be effectively visually perceived from outside. The clearance between the outer peripheral surface of rotary member 30 and opening 29 is large enough to obtain an effective reflection even with the internal illumination. As the transparent body 90 is formed to be long in the form of a round-sectioned bar, the adjacent rotary member 30 and its indicating element 41 may be visually perceived. However, as the outer peripheral surface 94 of body 90 has a lustrous surface, the light of the adjacent rotary member will be reflected by this surface 94. Therefore, the adjacent rotary member will not enter the field of vision, and only the corresponding indicating element will be visually perceived.

Even at the time of illumination at night, the internal reflected light will be reflected by the lustrous surface, and the reflected light of the adjacent rotary member will not pass into the transparent body. In case the indicating elements are colored, the reflected light of the adjacent indicating element of a different color will not mix in, and only the corresponding indicating element will be able to be definitely discerned and visually perceived. Therefore, the indication of the service and inspection time will not be overlooked.

I claim:

1. A vehicle service and inspection time indicating device, comprising:

a meter case having a front surface;

an integrating odometer attached to said vehicle, including at least one rotatable wheel for registering the distance travelled by said vehicle, said odometer being enclosed within said meter case;

rotary members rotatably and operatively connected with said integrating odometer;

an indicating element provided on a peripheral surface of each of said rotary members, said indicating element being adapted to be visually perceived on said front surface of said meter case from a panel of said meter case, in an indicating state;

said indicating state beng maintained until said rotary members is stopped and reset;

an opening provided in said meter panel facing said rotary members, said opening being disposed in a path along which said indicating element is visually perceived in said indicating state;

a transparent body having a lustrous outer surface, said body being adapted to approach at one end thereof said indicating element, and to be present at the other end thereof in said opening, said body being fitted, inserted, and set in said opening;

said end of said body present in said opening having an outer surface which is outwardly curved and expanded to have a lens effect with said body;

resetting operation members provided so that their end surfaces do not project from said front surface of said meter case;

release and reset means provided for releasing and resetting said rotary members to a start position;

said resetting operation members being operably connected to said release and reset means and being adapted to activate said release and reset means for releasing and resetting said rotary members to said start position;

each said resetting operation member being loosely fitted in a hole provided in a lower portion of said meter case, and being resiliently supported in said hole so that its end surface may not project from said front surface of said meter case so as to be released and reset to said starting position by being pressed on said end surface thereof; and a groove configured to be engaged by the pointed end of the vehicle's ignition key being made on said end surface of each said resetting operation member so that the rotary members may be released and reset to said start position when said ignition key is inserted into said groove.

2. A device according to claim 1, wherein:

said transparent body is a bar-shaped member of substantially round cross section and is formed with a flange of a diameter larger than of said opening so that a clearance may be held between the end surface of said transparent body and said indicating element when said flange part contacts said meter panel.

3. A device according to claim 1, wherein:

said release and reset means are adapted to release and reset said rotary members to a start position by rotating said rotary members through a predetermined angle.

* * * * *